US006821418B2

(12) United States Patent
Huang (10) Patent No.: US 6,821,418 B2
(45) Date of Patent: Nov. 23, 2004

(54) SURFACE MODIFICATION OF A POROUS POLYMER MONOLITH AND PRODUCTS THEREFROM

(75) Inventor: Xian Huang, Ithaca, NY (US)

(73) Assignee: Advion BioSciences, Inc., Ithaca, NY (US)

( * ) Notice: Subject to any disclaimer, the term of this patent is extended or adjusted under 35 U.S.C. 154(b) by 123 days.

(21) Appl. No.: 10/354,256

(22) Filed: Jan. 29, 2003

(65) Prior Publication Data

US 2003/0111418 A1 Jun. 19, 2003

Related U.S. Application Data

(62) Division of application No. 09/878,495, filed on Jun. 11, 2001, now abandoned.
(60) Provisional application No. 60/210,890, filed on Jun. 9, 2000.

(51) Int. Cl.[7] ............................................. B01D 15/08
(52) U.S. Cl. ............................... 210/198.2; 210/502.1; 210/635; 210/656; 428/318.4; 428/318.6; 521/31; 521/38; 521/54
(58) Field of Search ............................. 210/635, 656, 210/198.2, 502.1; 428/318.4, 318.6; 521/31, 38, 54

(56) References Cited

U.S. PATENT DOCUMENTS

| 5,316,680 | A | 5/1994 | Frechet et al. ............... 210/635 |
| 5,334,310 | A | 8/1994 | Frechet et al. ........... 210/198.2 |
| 5,453,185 | A | 9/1995 | Frechet et al. ........... 210/198.2 |
| 5,647,979 | A | 7/1997 | Liao et al. ............... 210/198.2 |
| 5,683,800 | A | 11/1997 | Stringfield et al. ......... 210/635 |
| 5,929,214 | A | 7/1999 | Peters et al. ............. 210/198.2 |
| 5,935,429 | A | 8/1999 | Liao et al. ............... 210/198.2 |
| 6,238,565 | B1 | 5/2001 | Hatch ...................... 210/198.2 |
| 6,355,791 | B1 | 3/2002 | Gjerde et al. ............... 210/635 |
| 6,372,130 | B1 | 4/2002 | Gjerde et al. ............ 210/198.2 |

FOREIGN PATENT DOCUMENTS

DE     249 703 A1    9/1987

OTHER PUBLICATIONS

Seubert et al., "Sulfoacylated Macroporous Polystyrene–Divinylbenzene: A New Type of Cation Exchanger for the Analysis of Multivalent Metal Cations," *J. Chromatogr. A.*, 792:149–157 (1997).
Maa et al., Rapid Analysis of Proteins and Peptides by Reversed–Phase Chromatography with Polymeric Micropellicular Sorbents, J. Chromatogr., 445:71–86 (1988).
Huber et al., "Application of Micropellicular Poly–styrene/Divinylbenzene Stationary Phases for High–Performance Reversed–Phase Liquid Chromatography Electrospray–Mass Spectrometry of Proteins and Peptides," Chromatographia, 44:438–448 (1997).
Hjertén et al., "High–Performance Liquid Chromatography on Continuous Polymer Beds," J. Chromatogr., 473:273–275 (1989).

(List continued on next page.)

Primary Examiner—Ernest G. Therkorn
(74) Attorney, Agent, or Firm—Nixon Peabody LLP (57) ABSTRACT

A process is provided for modifying a porous polystyrene monolith to render its internal pore surfaces grafted with alkyl groups, preferably of at least four carbon atoms, which includes the step of alkylating the monolith with a uniform liquid solution containing a Friedel-Crafts catalyst and an alkyl halide. A surface-modified monolith produced thereby is an efficient separation medium in reversed-phase liquid chromatography for both small and large biomolecules.

22 Claims, 6 Drawing Sheets

OTHER PUBLICATIONS

Peters et al., "Molded Rigid Polymer Monoliths as Separation Media for Capillary Electrochromatography, 1. Fine Control of Porous Properties and Surface Chemistry," Anal. Chem., 70:2288–2295 (1998).

Gusev et al., "Capillary Columns With in Situ Formed Porous Monolithic Packing for Micro High–Performance Liquid Chromatography and Capillary Electrochromatography," J. Chromatogr. A. 855–273–290 (1999).

Zhang et al., "Capillary Electrochromatography of Proteins and Peptides with a Cationic Acrylic Monolith," J. Chromatogr. A. 887:465–477 (2000).

Roberts et al., "Alkylations of Arenes with Alkyl Halides," Friedel–Crafts Alkylation Chemistry, New York, New York: Marcel Dekker, Inc., pp. 122–227 (1984).

Huber et al., "High–Resolution Liquid Chromatography of Oligonucleotides on Nonporous Alkylated Styrene–Divinylbenzene Copolymers," Anal. Biochem., 212:351–358 (1993).

Huang et al., "Capillary Zone Electrophoresis with Fluid–Impervious Polymer Tubing Inside a Fused–Silica Capillary," J. Chromatogr. A. 788:155–164 (1997).

Petro et al., "Molded Continuous Poly(Styrene–co–divinylbenzene) Rod as a Separation Medium for the Very Fast Separation Of Polymers Comparison of the Chromatographic Properties of the Monolithic Rod With Columns Packed with Porous and Non–Porous Beads in High–Performance Liquid Chromatography of Polystyrenes," J. Chromatogr. A. 752:59–66 (1996).

Ericson et al., "Preparation of Continuous Beds for Electrochromatography and Reversed–Phase Liquid Chromatography of Low–Molecular–Mass Compounds," J. Chromatogr. A. 767:33–41 (1997).

SURFACE MODIFICATION OF A POROUS POLYMER MONOLITH AND PRODUCTS THEREFROM

This application is a division of U.S. patent application Ser. No. 09/878,495, filed Jun. 11, 2001, now abandoned which claims the benefit of U.S. Provisional Patent Application Ser. No. 60/210,890, filed Jun. 9, 2000, which is herein incorporated by reference in its entirety.

FIELD OF THE INVENTION

The invention relates to a process for the surface modification of a porous polymer monolith and products produced therefrom. In particular, the process relates to the surface modification of a polystyrenic monolith by alkylating its through-pore surfaces and to products so modified.

BACKGROUND OF THE INVENTION

Liquid chromatography, as a technique for the separation of soluble, non-volatile compounds, has become over the past 30 years an indispensable tool for chemical and biochemical analyses in numerous disciplines of chemistry and life sciences. Generally, separation in liquid chromatography is achieved in a column by selective distribution of the sample molecules between a stationary phase and a mobile phase. In reversed-phase liquid chromatography, the stationary phase is usually highly hydrophobic or non-polar. Conventional reversed-phase liquid chromatography uses 5–10 $\mu$m spherical silica beads that have been modified by covalent attachment of hydrocarbon chains including 4, 8, or 18 carbon atoms to provide a non-polar surface.

In addition to silica beads, PS-DVB particles are also widely used as a stationary phase support. Actually, the PS-DVB surface can be directly used as the reversed-phase chromatography stationary phase since it is highly hydrophobic. Maa and Horváth, *J. Chromatography*, 445 (1988), 71–86, disclose that PS-DVB particles are very effective for the rapid analysis of proteins in the reversed-phase mode. However, for separation and identification of smaller biomolecules like peptides, which have become more crucial to the new emerging field of proteomics, the unfunctionalized PS-DVB particles may present unacceptable poor resolution. It has been shown by Huber et al., *Chromatographia*, 44 (7/8) (1997), 438–448, that alkylation of PS-DVB particles to graft octadecyl chains on their surface is necessary to achieve good resolution for reversed-phase liquid chromatography of peptides.

The increasing demand for more efficient and rapid separations in many areas especially for the pharmaceutical industry has initiated research towards column consolidation and miniaturization. In recent years, column consolidation has been achieved as a result of the introduction or invention of porous polymer continuous beds or monoliths. Hjertén, *J. Chromatography*, 473 (1989), 273–275 introduces a polymer gel continuous bed prepared by in situ polymerization of an aqueous solution of acrylamide derivatives. Svec and Fréchet disclosed in 1994 and 1995 (U.S. Pat. Nos. 5,334,310 and 5,453,185) a continuous liquid chromatographic column containing a separation medium in the form of a macroporous polymer plug. The column miniaturization has also been achieved by a porous polymer monolith prepared by free radical polymerization in situ in a fused silica capillary. The development of fritless columns with a polymer-based porous monolith rather than conventional spherical beads has become more and more important since it meets the requirement of today's micro-scale liquid chromatography and capillary electrochromatography as described by Liao and Hjertén (1997 U.S. Pat. No. 5,647,979); Peters et al., *Analytical Chemistry*, 70 (1998), 2288–2295; Gusev et al., *J. Chromatography A*, 855 (1999), 273–290; and Zhang et al., *J. Chromatography A*, 887 (2000), 465–477.

Practicable methods for preparing a PS-DVB monolith have been published. The PS-DVB monolith has become an acceptable consolidated column packing material. However, the art lacks a method to effectively impart alkyl chains onto the through-pore surfaces of a PS-DVB monolith so as to provide an effective column packing capable of enhancing the resolution of peptides in reversed-phase liquid chromatography.

Several methods have been proposed to introduce alkyl functional groups to the polymer monolith. In one method, the alkyl groups are directly imparted from a co-monomer, e.g., alkylene dimethacrylate, rather than divinylbenzene used for the initial polymerization as claimed in U.S. Pat. No. 5,453,185 (Svec and Fréchet). However, the introduction of a new monomer to the initial polymerization mixture may require redesign of the formulation and conditions including the selection of a new porogen. Moreover, only those alkyl chains in the polymer surfaces are needed for the separation, while the alkyl chains involved inside the bulk solid support are not necessary. It has been found that alkyl chains imparted by this process do not appreciably improve the resolution of peptides. Thus, this method for alkylating the monolith surfaces forms an ineffective stationary phase for separation of relatively smaller biomolecules like peptides.

The reaction of benzene with "amyl chloride" in the presence of aluminum chloride to produce "amylbenzene" was carried out by Charles Friedel and James Mason Crafts in 1877. For over a century, Friedel-Crafts alkylation chemistry has been one of the most interesting aspects of modern organic theory (R. M. Roberts and A. A. Khalaf, "Friedel-Crafts Alkylation Chemistry", Mercel Dekker, Inc., New York, 1984). Major processes for the production of high-octane gasoline, synthetic rubber, plastics, and synthetic detergents are applications of Friedel-Crafts chemistry.

The Friedel-Crafts reaction has also been adopted for the surface modification of PS-DVB particles or beads to form reversed-phase column packing materials as disclosed by Huber et al., *Analytical Biochemistry*, 212 (1993), 351–358. According to the Huber et al. process, the solid aluminum chloride is directly added to the suspension of PS-DVB particles in an alkyl chloride (1-chlorooctadecane). No other solvent was added during the multiphase reaction. Since the reactantion is controlled by diffusion, the size of the particles which can be modified is limited.

That process is not suitable for alkylating the through-pore surfaces of a porous PS-DVB monolith. First, the solid state catalyst is difficult to introduce into the internal pores of a monolith since the solid catalyst is not very soluble in the alkylating solution. Second, the internal pores of the monolith may become clogged with precipitated solid that remains inside the monolith during the Friedel-Crafts reaction. Although there are a few liquid-state Friedel-Crafts catalysts, these are not suitable for this purpose. For example, tin(IV) chloride is a liquid and is easily filled into the monolith porous structure, but it may precipitate insoluble substances during the Friedel-Crafts reaction and it is a very weak catalyst as well. Unlike a free benzene ring which can be easily alkylated in a few minutes through the Friedel-Crafts reaction at below room temperature, a polymer-based benzene ring is much more difficult to alkylate since the Friedel-Crafts reaction is controlled by diffusion. Heating is preferred for speeding the Friedel-Crafts reaction on a PS-DVB surface.

It would be desirable, therefore, to develop a process that can be used for alkylating through-pore surfaces of a porous PS-DVB monolith as the one-piece packing material of a liquid chromatographic column. A strong catalyst solution is needed.

SUMMARY OF THE INVENTION

One aspect of the present invention relates to a process for the surface modification of a porous polystyrenic monolith. The process includes wetting the monolith internal pore (through-pore) surfaces with an organic solvent used in the uniform liquid solution. The pore surfaces of the monolith are treated by contacting the monolith pores with a uniform liquid solution containing a Friedel-Crafts catalyst, an alkyl halide, and an organic solvent so as to alkylate the internal pore surfaces. The post-reaction solution is removed from the alkylated pore surfaces by rinsing the organic solvent through the monolith. Preferably, the alkylated pore surfaces are further washed by sequentially rinsing a series of solvents through the monolith, respectively.

Another aspect of the present invention relates to a porous polystyrenic monolith having alkylated internal pore surfaces.

The present invention results in a number of advantages over the prior art. It is an advantage of the present invention to provide a simple and reliable process for alkylating internal pore surfaces of a porous polystyrenic monolith. The monolith to be alkylated may be already molded in a fused-silica capillary, a plastic tubing, a micro-channel or hole of a silicon/polymer chip, or a similar opening in a separation device. The monolith is preferably a cross-linked polystyrene copolymer having internal through-pores that a liquid can pass through.

It is a further advantage of the present invention to provide surface-alkylated porous PS-DVB monoliths as consolidated and miniaturized columns for liquid chromatographic separation, especially in the reversed-phase mode. Advantages of this invention include the improved separation and identification of peptides by using such alkylated monolithic columns in reversed-phase liquid chromatography hyphenated with electrospray ionization mass spectrometry.

Other advantages of the present invention will be apparent to those skilled in the art from the following description and the appended claims.

DETAILED DESCRIPTION OF THE INVENTION

The present invention provides a process for alkylating outer and internal (through-pore) surfaces of a porous polystyrene monolith using the Friedel-Crafts alkylation reaction. The process is preferably effective on a highly cross-linked porous polystyrene monolith. The process includes the step of treating internal pore surfaces of the monolith, preferably, by filling them and then rinsing a uniform liquid solution containing a Friedel-Crafts catalyst, an alkyl halide, and an organic solvent through the monolith. Such a process was made possible by the discovery of the formulation of a suitable uniform liquid alkylating reagent solution. Preferably, a specific organic solvent is used. In this solvent, both the selected highly strong Friedel-Crafts catalyst and an alkyl halide (e.g., linear and primary octadecyl chloride) can be dissolved and a uniform liquid solution can be formed. By using the present process the alkylation reaction can be completed inside the monolith through-pores which eliminates clogging problems while the pore surfaces can be grafted with the desired alkyl groups. The process also includes a subsequent washing step in which the post-alkylation mixture is removed and the functionalized polystyrenic through-pore surfaces are cleaned without precipitation or clogging.

In a preferred embodiment of the present invention, a uniform liquid alkylating reagent solution is formulated for treating a porous polymer monolith. The monolith is a polystyrene-based copolymer, preferably, poly(styrene-co-divinylbenzene) (PS-DVB) with a molecular ratio of about 10% to about 50% divinylbenzene. The internal pore size distribution and the porosity can be varied with the processes by which the monolith is prepared. Examples of such polystyrenic monoliths include those covered by U.S. Pat. No. 5,334,310 and U.S. Pat. No. 5,334,310 (Fréchet and Svec) and introduced by *J. Chromatography A*, 855 (1999), 273–290 (Gusev et al.) and *J. Chromatography A*, 887 (2000), 465–477 (Zhang et al.), which are each herein incorporated by reference in their entirety. The processes for preparing such monoliths have been modified at Advion BioSciences, Inc. (formerly Advanced BioAnalytical Services, Inc., Ithaca, N.Y.) based on the company's licensed US Patents and other published literature, which monoliths are commercially available from this company.

The porous polystyrenic monolith can be prepared in situ in a tube or open ended structure. Suitable tubes include metal tubes, plastic tubes, capillary tubes, and the like. Also suitable are microchips made from silicon, plastic, glass, and the like. Preferably, the diameter of the tube is about several millimeters or less. For example, a PS-DVB monolith covalently bonded in a fused silica capillary can be prepared by first silanizing the internal wall of the capillary with the method introduced by Huang and Horváath, *Journal of Chromatography A*, 788 (1997) 155–164. In accordance with the present invention, the PS-DVB monolith is prepared in situ inside a pretreated and silanized fused silica capillary having an inner diameter, preferably the commercially available sizes of about 50 μm or about 75 μm. In the initial polymerizing solution, the monomer ratio is 40% (v/v) and the porogen is the co-solvents 1-propanol and formamide. The initiator used is 2'2-azobisisobutyronitrile (AIBN).

With the same polymerization solution, the PS-DVB monolith is also prepared in situ in commercially available PEEK tubing or stainless steel tubing. In this case, the monolith is not covalently bonded onto the inner wall of the PEEK or stainless steel capillary. It is remarkable that a 10 cm long PEEK or stainless steel column (125 μm I.D., 1/16" O.D.) containing such polymer monolith is mechanically stable under a back pressure as high as 200 bar delivered by acetonitrile flow.

Prior to alkylation, the through-pore surfaces of the porous polystyrenic monolith are wetted or swelled by the solvent that is used to make the uniform liquid catalyst solution. Preferably the monolith is washed sequentially with several organic solvents, such as, methylene chloride, N,N-dimethylformamide, and nitrobenzene or nitromethane. The final pre-wash not only improves surface wetting characteristics but is also preferably compatible with the subsequent alkylating solution. Washing with the initial solvents enables the relatively quick loading of the desired solvent prior to loading the alkylating solution. Preferably, the solvent for the final pre-wash, nitrobenzene or nitromethane, is also the solvent for preparing alkylating solution. In rinsing with the solvent, the flow is driven through the monolith, usually by pressure. This step is preferably completed at room temperature.

A mixture of a Friedel-Crafts catalyst and an alkyl halide is formulated for use with the alkylating process. Suitable Friedel-Crafts catalysts include those that can be dissolved in the solvent and are strong enough to achieve suitable alkylation. As a rule, the mixture is preferably prepared as a uniform liquid from the Friedel-Crafts catalyst and alkyl halide selected. To guarantee a strong alkylating reaction under mild conditions, the Friedel-Crafts catalysts are preferred to be as strong as possible. Preferred are those commercially available strongest Friedel-Crafts catalysts such as aluminum chloride ($AlCl_3$), aluminum bromide ($AlBr_3$) and antimony pentachloride ($SbCl_5$).

Suitable solvents include those solvents that can dissolve the Friedel-Crafts catalyst and the alkyl halide and form a uniform liquid reactant. Nitromethane and nitrobenzene can dissolve most alkyl halides, the commercially available strongest Friedel-Crafts catalysts, and are most preferred. For example, nitrobenzene can dissolve an 18-carbon halide such as octadecyl chloride. With nitromethane or nitrobenzene as the solvent, a uniform liquid solution containing the catalyst and the alkyl halide can be formed from a wide variety of catalyst and alkyl halide combinations. Suitable high concentrations of the catalyst and alkyl halide can be preferably chosen to avoid precipitation during the treatment.

Preferred alkyl halides include primary, secondary, or tertiary chloride or bromide. The alkyl groups include linear, branched, cyclic chains, or combinations thereof. For reversed-phase chromatography, hydrophobic groups preferably having 4, 8, or 18 carbon atoms are chosen for the stationary phase. Additionally preferred alkyl halides for preparing the uniform liquid alkylating solution include linear primary chloride or bromide having 4, 8, or 18 carbon atoms.

The internal pore surfaces of the porous polystyrenic monolith are filled with the uniform liquid alkylating solution described above and then the solution is rinsed through the monolith. Although theoretically the benzene ring can be alkylated under room temperature, gentle heating is preferred to speed and enhance the diffusion-dominated reaction with the polymer surfaces. The preferred reaction temperature for the alkylating solution contacting the pore surfaces, is from about 45° C. to about 70° C. Typically, the heating step can take several hours or longer.

The reaction solution is then removed from the monolith. A post-alkylation wash is preferred for making highly cleaned alkylated monoliths. The risk for pore-clogging is high if the wrong solvent is used, since the residual alkylating mixture can produce solid precipitates or a highly viscous liquid. A preferred solvent for the post reaction wash is the same solvent as that used for preparing the alkylation solution, e.g., nitrobenzene or nitromethane, which removes the post-alkylation solution from the monolith and rinses the alkylated pores by being passed through the monolith. Typically, this wash may not completely remove the residual mixture in the pores. An additional wash is preferably sequentially applied, for example, with N,N-dimethylformamide, 1 M HCl aqueous solution, water, and acetonitrile, respectively.

The following examples illustrate several embodiments of the present invention. However, the invention should not be limited to the embodiments illustrated.

EXAMPLE 1

This example illustrates a process for octadecylating a porous PS-DVB monolith formed in situ in a PEEK capillary.

A PEEK capillary (internal diameter 0.005-in or 125 μm, outer diameter 1/16-in, and length 10 cm) containing a PS-DVB monolith was used for the alkylation. Specifically, the monolith was prepared from heating the solution sealed inside the capillary containing 20% v/v styrene, 20% v/v DVB (80%, mixture of isomers), 40% v/v 1-propanol, 20% v/v formamide, and 0.3% w/v 2'2-azobisisobutyronitrile (AIBN), for 24 hours at 70° C. After the residual mixture was removed, the porous monolith was thoroughly washed with methylene chloride and N,N-dimethylformamide.

A screw top glass vial (1.5- to 3-ml) having an open-top cap with a Teflon-faced plastic septum was used for delivering liquid into the monolithic column. Typically, a liquid contained in the vial was pressurized by a nitrogen source of 60–100 psi introduced with a fused silica capillary inserted through the septum.

Each end of the monolithic column was extended with a fused silica capillary by using a connection union. With one end (the fused silica capillary) inserted into the capped vial containing 1.0 ml nitrobenzene, the column was rinsed with nitrobenzene for 1 hour before the alkylation.

25 mg of aluminum chloride powder was put into another screw top glass vial. 0.5 ml of nitrobenzene was added. After stirring for a few minutes, 0.5 ml of 1-chlorooctadecane (liquid) was added. A uniform solution was formed after further stirring. The vial was then closed using the open-top cap with the septum. In accordance with the procedure described above, the column was rinsed with the prepared solution for about 1 hour with an inlet pressure from 60 to 100 psi. The column was then filled with the same solution and sealed at both ends to prevent leakage. Subsequently, the column was placed in an oven and heated at 60° C. for 12 hours.

The post-alkylation mixture was removed by pressurized nitrobenzene liquid. The alkylated column was finally washed sequentially with nitrobenzene, N,N-dimethylformamide, 1 M HCl aqueous solution, water, and acetonitrile.

EXAMPLE 2

This example illustrates a typical application of the monolithic capillary column prepared from Example 1. Peptides from a tryptic digest of cytochrome c were separated and analyzed by LC-ESI/MS using the octadecylated monolithic column.

The octadecylated PS-DVB monolithic column (125 µm in inner diameter and 10 cm in length) produced from Example 1 was used as a reversed-phase liquid chromatographic column. The column was attached to a Micromass LCT mass spectrometer with a tapered fused silica capillary (tip end inner diameter, 10 µm, flame-pulled from a fused silica capillary having 150 µm outer diameter and 50 µm inner diameter) as the electrospray interface. A micro gradient pump, Eldex MicroPro 1000 syringe pumping system, was used to deliver the mobile phase to the column. In the mobile phase flow line, a Valco micro-electric two position valve actuator with 1 µL injection volume was connected after the pump. A split valve was connected after the sample injector and right before the column inlet, which split 1/100 of the main flow into the column while the remainder went into the waste. All connection capillaries were nonconductive fused silica capillaries. The mobile phase flow rate before the split was typically 30 µL/min. The flow rate for the column was maintained at 300 nL/min. The applied high voltage for the electrospray ionization was 3.5 kV. Peptide mass spectra were recorded in the range of 380 to 1700 m/z.

A Sigma standard protein, cytochrome c, was digested in the presence of trypsin under denaturating conditions with 7 M urea. The sample mixture of the tryptic digest for the LC-ESI/MS test contained 70 pmol/µl each of the fragments (peptides) (injected before the 1:100 split valve).

Figure 1:
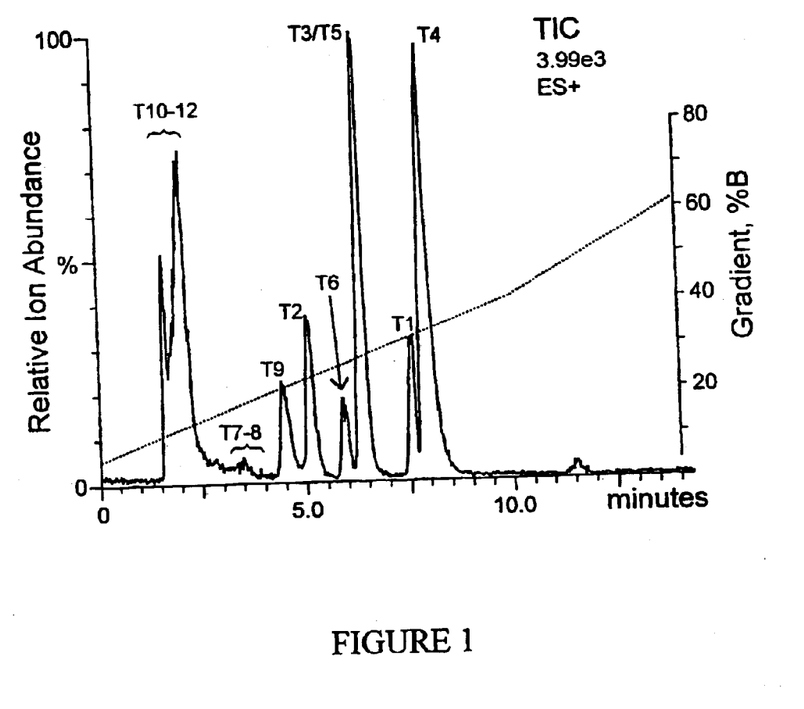
FIG. 1 is the total ion current (TIC) profile from the reversed-phase LC-ESI/MS of a tryptic digest cytochrome c described in Example 2. The peaks representing different peptide fragments (T1–12) are labeled. The capillary column having an alkylated porous PS-DVB monolith was produced in Example 1.
Figure 2:
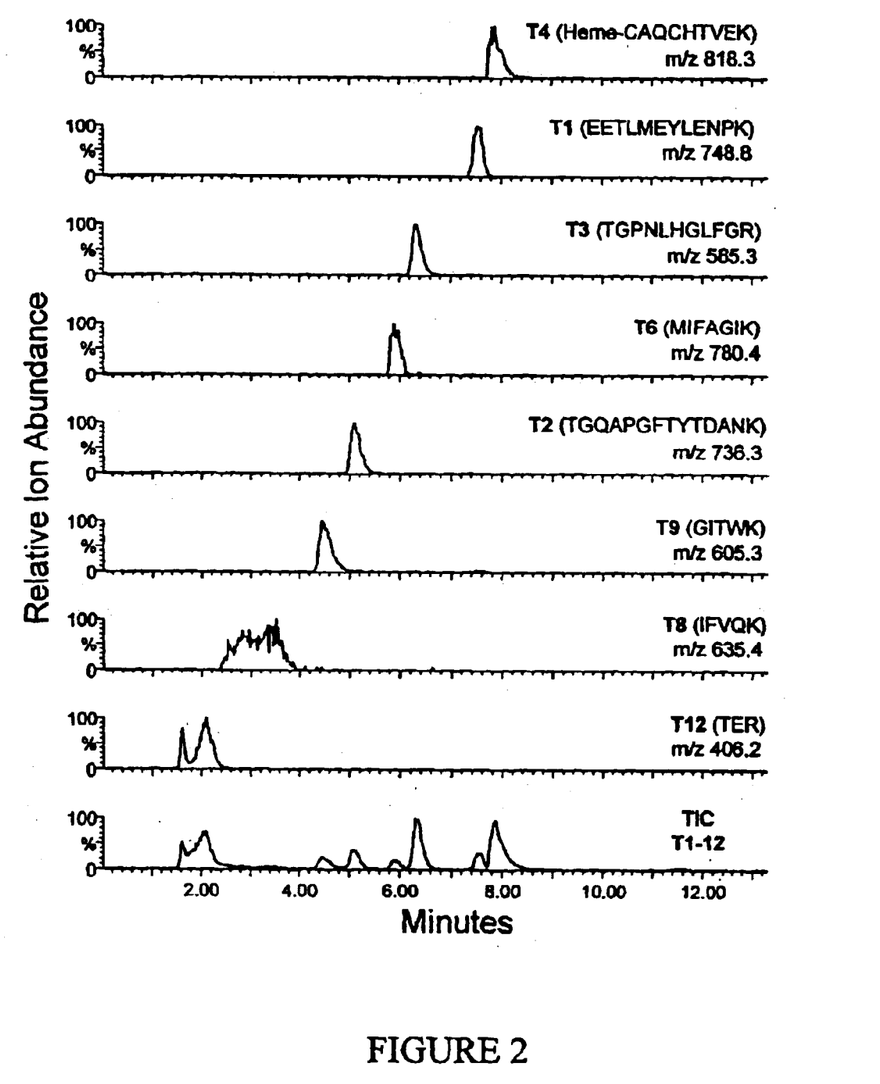
FIG. 2 is the TIC profile of the tryptic digest cytochrome c from FIG. 1 and the extracted ion current profiles for the selected peptide fragments.

The separation results are presented as the chromatogram and the mass spectra shown in FIGS. 1 and 2. The mobile phases for the gradient elution were: A=0.1% v/v acetic acid and 0.01% v/v heptafluorobutyric acid in water; and B=0.1% v/v acetic acid and 0.01% v/v heptafluorobutyric acid in acetonitrile. The gradient elution was programmed as: 0→10→15 min; 5%→40%→70% B (i.e., acetonitrile concentration 5%→40%→70% v/v).

Figure 3:
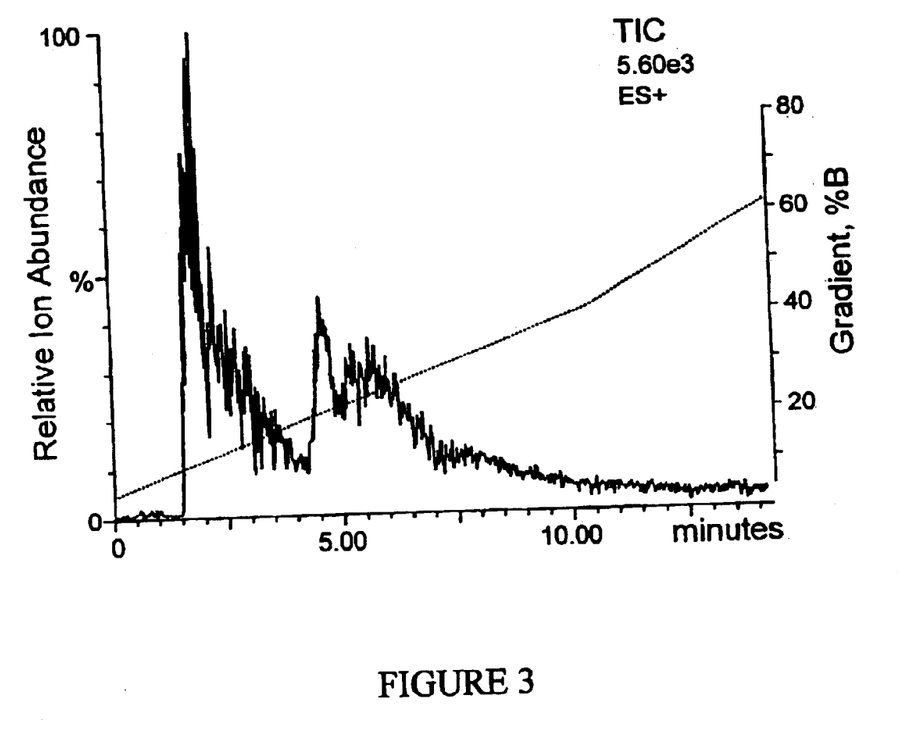
FIG. 3 is the reversed-phase LC-ESI/MS of the tryptic digest cytochrome c using the same conditions as for FIG. 1 with the unmodified monolithic PS-DVB column described in Example 2.

For comparison, prior to the octadecylation (described in Example 1) the monolithic PS-DVB column was tested with the same sample and experimental conditions (see the description for FIG. 1). The separation results are shown in FIG. 3. By the comparison of FIG. 3 with FIG. 1 it is shown that the PS-DVB stationary phase without octadecyl groups provided very poor resolution for the reversed-phase chromatographic separation of peptides from the cytochrome c digest.

EXAMPLE 3

This example illustrates a process for octadecylating a porous PS-DVB monolith covalently bonded in a fused silica capillary.

A fused silica capillary (inner diameter 75 µm, outer diameter 375 µm, and length 20 cm) containing covalently bonded PS-DVB monolith was prepared as described above and used for the octadecylation.

The procedure for octadecylating a porous PS-DVB monolith in a fused silica capillary was the same as that described in Example 1. The removal of post-alkylation mixture and the wash of the column were operated under relatively higher pressure (100 psi) due to the smaller column inner diameter.

EXAMPLE 4

This example illustrates the use of the surface-alkylated porous PS-DVB monolith in a fused silica capillary prepared from Example 3. By using the column, standard peptides were separated and characterized in liquid chromatography hyphenated with electrospray ionization mass spectrometry (LC-ESI/MS).

The monolithic capillary column with octadecyl groups as the stationary phase produced from Example 3 was cut to 10 cm in length. The testing system and procedure were the same as that of Example 2.

Figure 4:
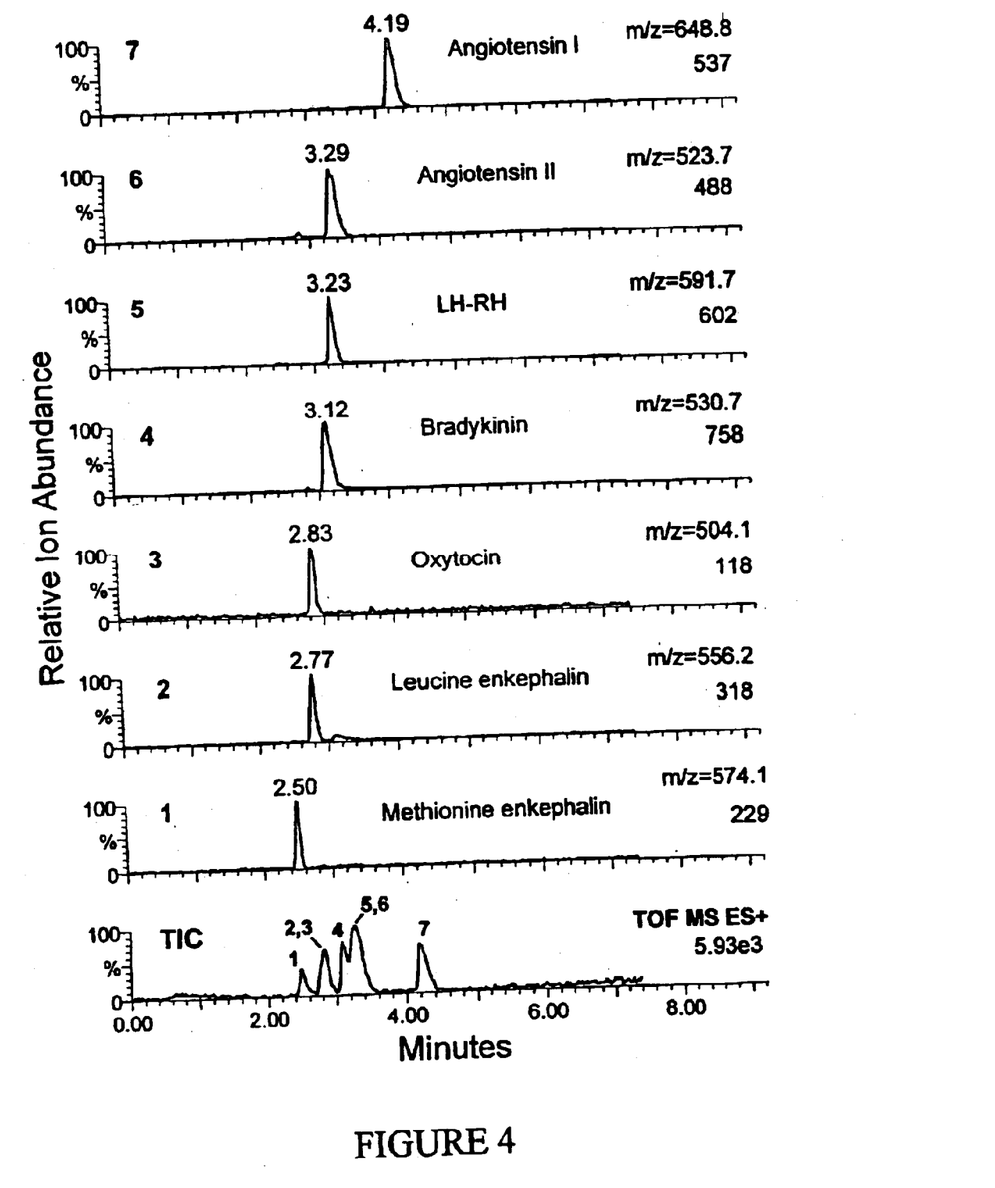
FIG. 4 is the reconstructed full-scan LC-ESI/MS total ion current (TIC) profile and extracted ion current profiles from the analysis of the synthetic peptide mixture described in Example 4. The capillary column having the alkylated porous PS-DVB monolith was produced in Example 3.
Figure 5:
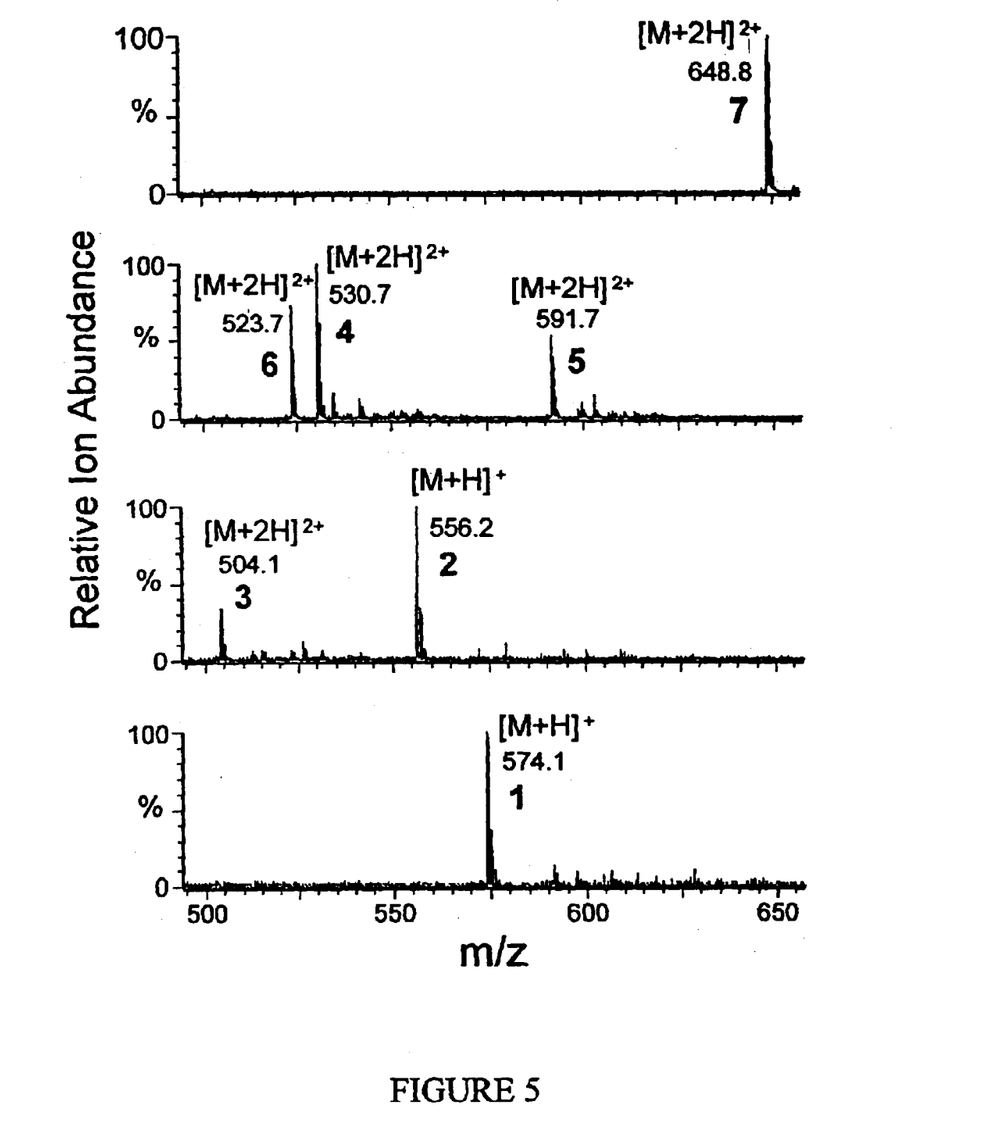
FIG. 5 is the mass spectra related to the chromatograms of FIG. 4 and described in Example 4.

A synthetic mixture containing 7 Sigma standard peptides (14 pmol each in water, injected before the 1:100 split valve) was separated in reversed-phase LC mode under gradient elution conditions. The injected sample mixture contained: 1) methionine enkephalin, 2) leucine enkephalin, 3) oxytocin, 4) bradykinin, 5) LH-RH, 6) angiotensin II, and 7) angiotensin I. The separation results are presented as the chromatogram and the mass spectra shown in FIGS. 4 and 5. The mobile phases for the gradient elution were: A=0.1% v/v trifluoroacetic acid in water; and B=0.1% v/v trifluroacetic acid in acetonitrile. The gradient elution was completed in 10 minutes while the mobile phase was changed from 10% B to 50% B (i.e., acetonitrile concentration from 10 to 50% v/v).

EXAMPLE 5

In accordance with the same procedure as described in Example 1, 25 mg of aluminum chloride powder was put into a screw top glass vial. 0.5 ml of nitromethane was added. After stirring for a few minutes, 0.5 ml of 1-chlorobutane was added. A uniform solution was formed after further stirring. The vial was then closed using the open-top cap with the septum. The other steps for treating the capillary monolith were the same as that in Example 1. The PS-DVB surfaces were modified with butyl chains.

EXAMPLE 6

This example illustrates a process for alkylating a porous PS-DVB monolith molded in a micro-opening of a silicon or polymer chip.

A porous PS-DVB monolith was formed in situ in a vertical cylindrical through-opening with a diameter of 100 µm in a silicon chip or wafer. The process for preparing the chip-molded monoliths was modified from that for capillary monoliths.

Figure 6:
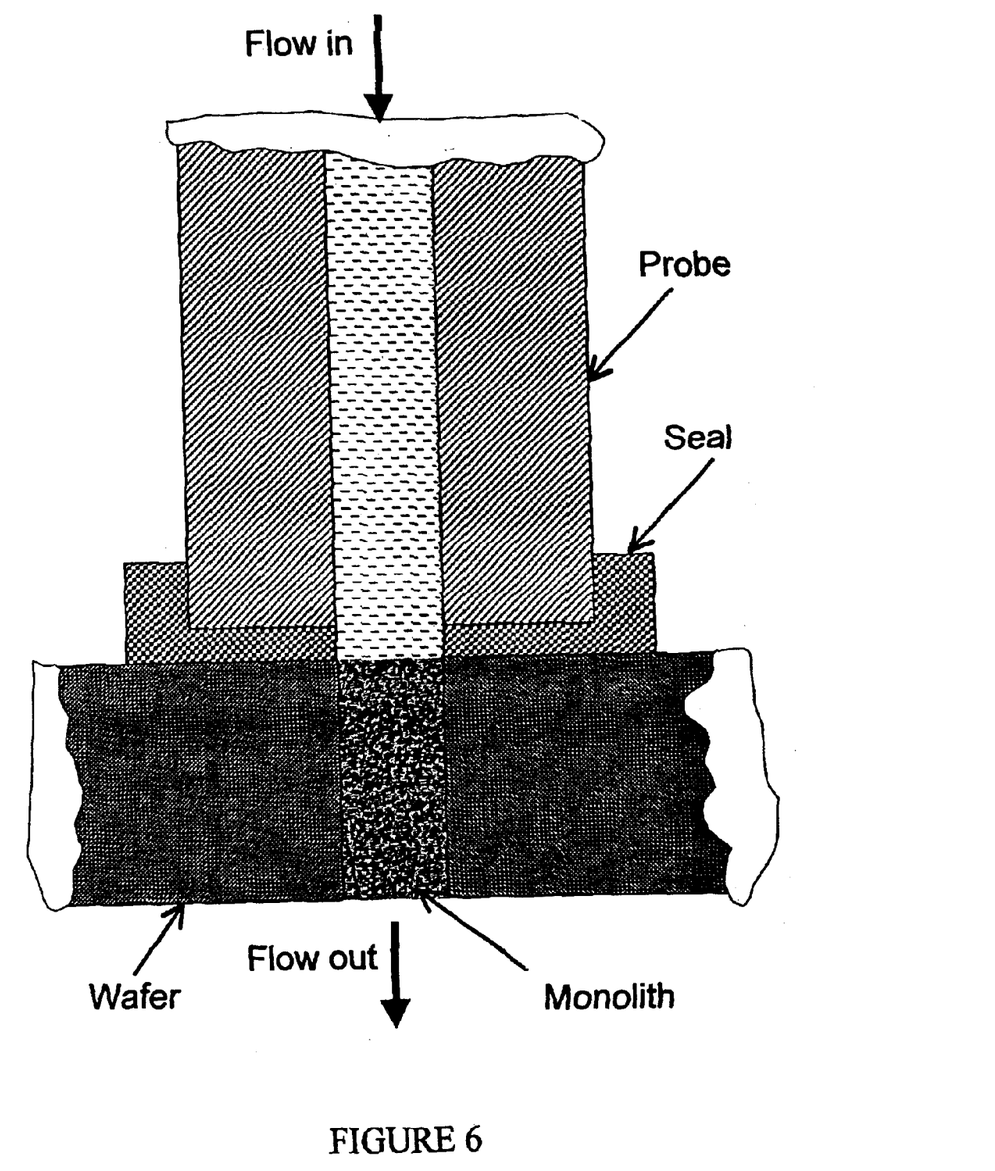
FIG. 6 is a cross-section view of the monolith showing liquid forced through the monolith molded in a chip with a liquid delivery probe in Example 5.

A liquid was forced into the monolith by using a liquid delivery probe as shown in FIG. 6. The liquid in the probe was driven by a nitrogen source with a pressure of up to 30 psi. The chip-molded monolith was wetted, treated, and washed with the liquid delivery probe as described in Example 1.

What is claimed:

1. A process for the surface modification of a porous polystyrenic monolith, comprising the steps of:
    (a) wetting the monolith internal through-pore surfaces with an organic solvent used in step (b);
    (b) treating the internal through-pore surfaces of said monolith by contacting said monolith pores with a uniform liquid solution comprising a Friedel-Crafts catalyst, an alkyl halide, and an organic solvent so as to alkylate the internal through-pore surfaces; and (c) removing the post-reaction solution from the alkylated through-pore surfaces by rinsing the organic solvent used in step (b) through said monolith.

2. The process of claim 1, further comprising washing said alkylated through-pore surfaces by sequentially rinsing a series of solvents through said monolith.

3. The process of claim 2, wherein said series of solvents are N,N-dimethylformamide, 1 M HCl aqueous solution, water, and acetonitrile, respectively.

4. The process of claim 1, wherein said treating of the internal through-pore surfaces is performed with heating.

5. The process of claim 1, wherein said wetting of the monolith internal through-pore surfaces comprises rinsing said organic solvent through said monolith.

6. The process of claim 1, wherein said contacting of said monolith through-pores with a uniform liquid solution comprises filling said monolith with said uniform liquid solution and then rinsing said uniform liquid solution through said monolith.

7. The process of claim 1, wherein said porous monolith comprises a cross-linked polystyrene-based copolymer.

8. The process of claim 1, wherein said porous monolith comprises poly(styrene-co-divinylbenzene).

9. The process of claim 1, further comprising preparing said porous polystyrenic monolith in situ in a tube prior to said alkylation.

10. The process of claim 1, wherein said monolith is contained in a tube.

11. The process of claim 10, wherein said tube comprises a metal tube, plastic tube, or capillary tube.

12. The process of claim 1, wherein said tube comprises a microchip made from silicon, plastic, or glass.

13. The process of claim 1, wherein said monolith is a molded in a fused silica capillary.

14. The process of claim 1, wherein said monolith is contained within a rigid micro-opening of a silicon or polymer chip comprising a microfluidic separation device.

15. The process of claim 1, wherein said Friedel-Crafts catalyst is aluminum chloride ($AlCl_3$), aluminum bromide ($AlBr_3$), or antimony pentachloride ($SbCl_5$).

16. The process of claim 1, wherein said alkyl halide is a primary, secondary, or tertiary chloride or bromide having at least four carbon atoms.

17. The process of claim 1, wherein said alkyl halide has 4, 8, or 18 carbon atoms.

18. The process of claim 1, wherein said alkyl halide is linear, branched, cyclic, or combination thereof.

19. The process of claim 1, wherein said alkyl halide is octadecyl chloride.

20. The process of claim 1, wherein said solvent is nitrobenzene ($C_6H_5NO_2$) or nitromethane ($CH_3NO_2$), or mixture thereof.

21. The process of claim 1, wherein said solvent is capable of dissolving said Friedel-Crafts catalyst and is miscible in said alkyl halide.

22. The process of claim 1, wherein said wetting and rinsing are performed under pressure.

* * * * *